W. SCHMITT.
UPPER SLIDE MOUNTING FOR MULTIPLE SPINDLE LATHES.
APPLICATION FILED JAN. 21, 1915.
1,151,296.
Patented Aug. 24, 1915.
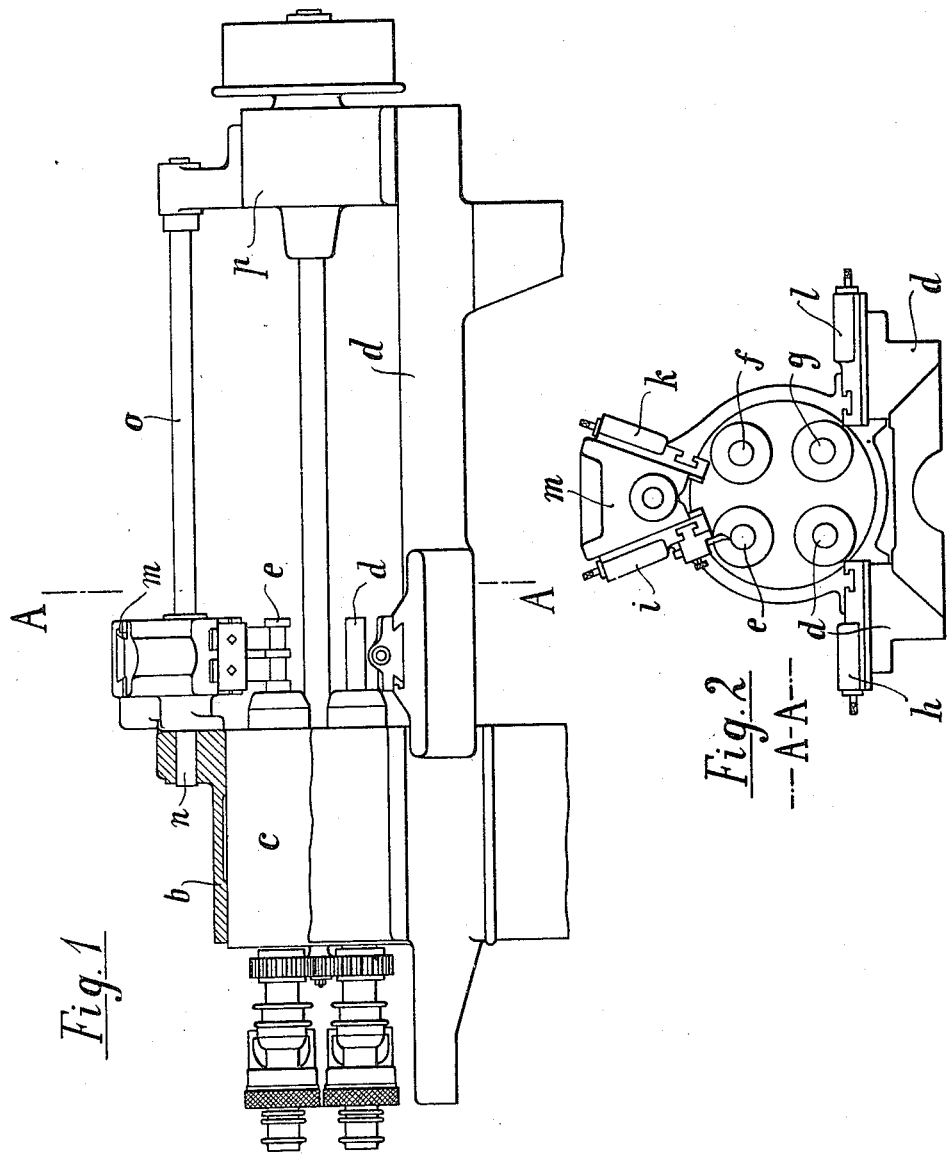
WITNESSES:
John C. Sanders
Albert F. Heuman
INVENTOR:
Wilhelm Schmitt,
BY
ATT'Y.

UNITED STATES PATENT OFFICE.

WILHELM SCHMITT, OF COLOGNE-KLETTENBERG, GERMANY.

UPPER-SLIDE MOUNTING FOR MULTIPLE-SPINDLE LATHES.

1,151,296. Specification of Letters Patent. Patented Aug. 24, 1915.

Application filed January 21, 1915. Serial No. 3,432.

*To all whom it may concern:*

Be it known that I, WILHELM SCHMITT, a subject of the German Emperor, residing at Cologne - Klettenberg, Germany, have invented new and useful Improvements in Upper-Slide Mountings for Multiple-Spindle Lathes, of which the following is a specification.

This invention has special reference to improvements in lathe construction and more particularly to an improved upper-slide mounting for multiple spindle lathes.

With multiple spindle lathes, that is lathes commonly known as of this type having a plurality or several spindles, cross-slides are used for turning the work or stock and usually there are as many spindles on the lathe as there are slides. Of these slides, those next to the frame of the lathe are usually carried or supported in a comparatively rigid manner, while hitherto, this was not the case with the upper-slide, the latter being generally fixed on the turret support but in such a manner to be constantly vibrated so that the use thereof was considerably impaired and when subjected to hard work, it was at times impossible to operate or work said upper-slides at all.

It is an object of the present invention to overcome these difficulties and for this purpose, the upper-slides are solely carried on the frame on both sides, in lieu of being fixed self-carrying on the turret support, whereby any lever operation produced by the self-carrying construction is prevented, so that the upper-slide can be used for effective working.

Referring to the accompanying drawings: Figure 1 is a longitudinal section of a lathe equipped in accordance with the invention. Fig. 2 is a sectional view taken on the line A—A of Fig. 1, with a front view of the slide.

As illustrated, on the frame "$a$" is fixed the turret support "$b$", which carries the intermittingly turning spindle-turret or turret "$c$". This turret is provided with four spindles "$d$", "$e$", "$f$", and "$g$", for carrying the work or stock to be operated on and in order to turn the work or stock, four radially movable slides "$h$", "$i$", "$k$", and "$l$" are provided. Of these slides, the slides "$h$" and "$l$" lying horizontally next to the frame of the lathe, are fixed to the latter, while the slides "$i$", "$k$" are held together in a carrying-piece "$m$" which is provided with prolongations "$n$", "$o$", which are in the form of oppositely extending supports. The prolongations "$n$" and "$o$" are fixed or held motionless on one side of the turret support "$b$" and on the other side are similarly fixed to the bearing "$p$" which is in turn fixed on the frame "$a$". In this manner the upper-slides "$i$" and "$k$" are firmly fixed on both sides with respect to the longitudinal dimensions of the lathe or frame thereof, by the prolongations "$n$" and "$o$", constituting a longitudinal brace or anchoring member for the carrying-piece "$m$" through which it is engaged, and thus for the upper-slides "$i$" and "$k$".

Although the upper-slides "$i$" and "$k$" are illustrated as mounted on a single carrying-piece "$m$", so far as the present invention is concerned in its broad aspect, it does not matter whether the slides "$i$" and "$k$" are supported or positioned to ride on separate carrying-pieces "$m$", whereby each of them is provided with a separate connecting rod or prolongation "$n$" and "$o$", or if they are arranged in groups.

The invention can be used quite as well for any number of spindles and slides and thus is adapted for varying types of lathes.

What I claim is:

1. In an upper-slide mounting for multiple spindle lathes, the combination with a lathe frame, a turret support and a turret carried thereby; of spindles carried by the turret, slide bearings carried by the frame, additional slide bearings and means bracing the latter slide bearings on either side of the latter to the support and frame, respectively.

2. In an upper-slide mounting for multiple spindle lathes, the combination with a lathe frame, a turret support fixed thereon, a turret carried thereby to be intermittingly turned, a plurality of spindles carried by the turret for supporting the work, a plurality of radially movable slides, certain of said slides supported on the frame, a carrying-piece supported by the turret support, certain of said slides being held on said carrying-piece and prolongations on either side of said carrying-piece and fixed against movement to the turret support and the frame respectively.

3. The combination with a multiple spindle lathe including a frame, a turret support carried thereby, a turret turnably carried by said support and provided with work carrying spindles, a plurality of slides, a carrying-piece, upper-slides carried by said carrying-piece, a bearing at one end of the frame, and rods projecting in opposite directions longitudinally of the frame from said carrying-piece and supported by said turret support and the bearing respectively, whereby said carrying-piece is held motionless on the frame together with the upper-slides.

4. In an upper-slide mounting for multiple spindle lathes, the combination with a frame, a turret support carried thereby, a turret rotatably carried by said support, a plurality of spindles for carrying work supported by said turret, and a plurality of slides for turning the work to be acted on, said slides comprising an upper series and a lower series, the lower series being positioned adjacent to and supported on the frame; of a carrying-piece to which the upper-slides are held, a bearing at one end of the frame opposing the turret support and extensions projecting in opposite directions from said carrying-piece to firmly fix the same and the slides carried thereby to the frame, said extensions engaging said bearings and the turret support respectively.

In testimony whereof I have signed my name to this specification in the presence of two subscribing witnesses.

WILHELM SCHMITT.

Witnesses:
J. WŸNEN,
J. D. ZIESECKE.

Copies of this patent may be obtained for five cents each, by addressing the "Commissioner of Patents, Washington, D. C."